US008868323B2

(12) United States Patent
Lommel et al.

(10) Patent No.: US 8,868,323 B2
(45) Date of Patent: Oct. 21, 2014

(54) COLLABORATIVE NAVIGATION USING CONDITIONAL UPDATES

(75) Inventors: Peter Lommel, Andover, MA (US); Benjamin Mohr, St. Loius Park, MN (US); Yunqian Ma, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 274 days.

(21) Appl. No.: 13/053,811

(22) Filed: Mar. 22, 2011

(65) Prior Publication Data
US 2012/0245844 A1 Sep. 27, 2012

(51) Int. Cl.
  G06F 17/10 (2006.01)
  G01C 21/00 (2006.01)
  G06T 7/00 (2006.01)

(52) U.S. Cl.
  CPC ....... *G01C 21/00* (2013.01); *G06T 2207/30241* (2013.01); *G06T 2207/10016* (2013.01); *G06T 2207/30212* (2013.01); *G06T 2207/30181* (2013.01); *G06T 7/0075* (2013.01); *G06T 2207/30252* (2013.01)
  USPC .......................................... 701/300; 701/519

(58) Field of Classification Search
  USPC ........ 701/300, 519, 532; 178/18.06; 382/153, 382/154
  See application file for complete search history.

(56) References Cited

U.S. PATENT DOCUMENTS

| | | | |
|---|---|---|---|
| 5,179,441 A | 1/1993 | Anderson et al. | |
| 5,432,712 A | 7/1995 | Chan | |
| 6,323,807 B1 | 11/2001 | Golding et al. | |
| 6,496,816 B1 | 12/2002 | Thiesson et al. | |
| 6,853,332 B1 | 2/2005 | Brookes | |
| 6,882,959 B2 | 4/2005 | Rui et al. | |
| 6,885,334 B1 | 4/2005 | Hager et al. | |
| 7,240,042 B2 | 7/2007 | Cheng et al. | |
| 7,409,293 B2 | 8/2008 | Hager et al. | |
| 7,698,108 B2 | 4/2010 | Haney et al. | |
| 7,725,253 B2 | 5/2010 | Foxlin | |
| 7,821,453 B2 | 10/2010 | Wu et al. | |
| 7,831,094 B2 | 11/2010 | Gupta et al. | |

(Continued)

OTHER PUBLICATIONS

Ingvalson, "Shared state selection and data exchange for collaborative navigation using conditionally independent parallel filters", "U.S. Appl. No. 13/672,337", Nov. 8, 2012, pp. 1-40, Published in: US.

(Continued)

*Primary Examiner* — Thomas Tarcza
*Assistant Examiner* — Kevin Myhre
(74) *Attorney, Agent, or Firm* — Fogg & Powers LLC

(57) ABSTRACT

A method for collaborative navigation between two or more platforms is provided. The method comprises establishing a communication link between a first platform and a second platform, making a sensor measurement from the first platform, updating state and covariance elements of the first platform, and transmitting the updated state and covariance elements from the first platform to the second platform. A conditional update is performed on the second platform to compute a new estimate of state and covariance elements on the second platform, which takes into account the measurement from the first platform. The method further comprises making a sensor measurement from the second platform, updating state and covariance elements of the second platform, and transmitting the updated state and covariance elements from the second platform to the first platform. A conditional update is performed on the first platform to compute a new estimate of state and covariance elements on the first platform, which takes into account the measurement from the second platform.

18 Claims, 2 Drawing Sheets

(56) References Cited

U.S. PATENT DOCUMENTS

| | | | |
|---|---|---|---|
| 2003/0210180 | A1 | 11/2003 | Hager et al. |
| 2005/0216182 | A1 | 9/2005 | Hussain et al. |
| 2006/0027404 | A1 | 2/2006 | Foxlin |
| 2006/0064295 | A1 | 3/2006 | Schwaiger et al. |
| 2007/0291130 | A1 | 12/2007 | Broggi et al. |
| 2008/0247668 | A1 | 10/2008 | Li et al. |
| 2008/0312833 | A1* | 12/2008 | Greene et al. .......... 701/301 |
| 2008/0316089 | A1 | 12/2008 | Forgrieve et al. |
| 2009/0048996 | A1 | 2/2009 | Bala |
| 2009/0125223 | A1 | 5/2009 | Higgins |
| 2009/0232358 | A1 | 9/2009 | Cross |
| 2010/0017046 | A1 | 1/2010 | Cheung et al. |
| 2010/0080469 | A1 | 4/2010 | Liu et al. |
| 2010/0195914 | A1 | 8/2010 | Isard et al. |
| 2010/0268458 | A1 | 10/2010 | Becker et al. |
| 2010/0274481 | A1 | 10/2010 | Krishnaswamy et al. |
| 2010/0303340 | A1 | 12/2010 | Abraham et al. |
| 2011/0070863 | A1 | 3/2011 | Ma et al. |
| 2012/0021764 | A1 | 1/2012 | Enright |
| 2012/0022784 | A1 | 1/2012 | Louis et al. |
| 2012/0121161 | A1 | 5/2012 | Eade et al. |
| 2012/0243775 | A1 | 9/2012 | Ma et al. |
| 2012/0257050 | A1 | 10/2012 | Simon |
| 2014/0143262 | A1 | 5/2014 | Ingvalson |

OTHER PUBLICATIONS

European Patent Office, "Office Action", Sep. 11, 2012, pp. 1-7, Published in: EP.
European Patent Office, "European Search Report", mailed Aug. 28, 2012, pp. 1-4, Published in: EP.
European Patent Office, "Office Action", "from Foreign Counterpart of U.S. Appl. No. 13/053,811", Nov. 5, 2012, pp. 1-8, Published in: EP.
Bahr et al., "Consistent Cooperative Localization", May 12, 2009, pp. 1-8.
Brown, Alison and Paul Olson, "Navigation and Electro-Optic Sensor Integration Technology for Fusion of Imagery and Digital Mapping Products", "Symposium on Vector Moving Maps Display", , Published in: Alexandria, VA.
Chang et al., "MAP Track Fusion Performance Evaluation", "Proceedings of the Fifth International Conference on Information Fusion", Jul. 2002, pp. 512-519, vol. 1.
Das et al., "Robust Visual Path Following for Heterogeneous Mobile Platforms", "2010 IEEE International Conference on Robotics and Automation", May 2010, pp. 2431-2437.
Fallon et al., "A Measurement Distribution Framework for Cooperative Navigation using Multiple AUV's", "2010 IEEE International Conference on Robotics and Automation", May 2010, pp. 4256-4263.
Fox et al., "A Probabilistic Approach to Collaborative Multi-Robot Localization", "Autonomous Robots", Jun. 2000, pp. 1-25, vol. 8, No. 3.
Geyer et al., "The Recursive Multi-Frame Planar Parallax Algorithm", "Proceedings of Third International Symposium on 3D Data Processing, Visualization and Transmission", 2006, Publisher: University of North Carolina, Published in: Chapel Hill, USA.
Huang et al., "Observability-based Consistent EKF Estimators for Multi-robot Cooperative Localization", Jun. 2011, pp. 1-21, vol. 30, No. 1.
Kroetsch, "Towards Gaussian Multi-Robot SLAM for Underwater Robotics", Jul. 25, 2005, pp. 1-11.
Moratuwage et al., "Extending Bayesian RFS SLAM framework to Multi-Vehicle SLAM", May 2012, pp. 1-6.
Moratuwage et al., "Collaborative Multi-Vehicle Localization and Mapping in Marine Environments", May 2010, pp. 1-6.
Nettleton, "Decentralised SLAM with Low-Bandwidth Communication for Teams of Vehicles", "Published at least as early as Dec. 2006", 2006, pp. 1-6.
Petrovskaya et al., "Model Based Vehicle Tracking for Autonomous Driving in Urban Environments", "Autonomous Robots Journal", Apr. 2009, pp. 123-139, vol. 26, No. 2-3.
Pinies et al., "Large Scale SLAM Building Conditionally Independent Local Maps: Application to Monocular Vision", "IEEE Transactions on Robotics", Oct. 2008, pp. 1-13, vol. 24, No. 5, Publisher: IEEE.
Pinies et al., "Scalable SLAM building Conitionally Independent Local Maps", "Proceedings of the 2007 IEEE/RSJ International Conference on Intelligent Robots and Systems", Oct. 29, 2007, pp. 3466-3471.
Roth et al., "Gibbs Likelihoods for Bayesian Tracking", Jun. 2004, pp. 1-8.
Roumeliotis et al., "Distributed Multirobot Localization", "IEEE Transactions on Robotics and Automation", Oct. 2002, pp. 781-795, vol. 18, No. 5.
Spenneberg et al., "Exploration of Underwater Structures with Cooperative Heterogeneous Robots", Jun. 2005, pp. 782-786, vol. 2.
"Vision Based Navigation and Precision/Dynamic Targeting for Air Vehicles (ImageNav)", "Available at www.virtualacquisitionshowcase.com/document/1301/briefing accessed Mar. 3, 2011", Nov. 2, 2009, pp. 1-5, Publisher: Scientific Systems Company, Inc.
Tola et al., "Daisy: An Efficient Dense Descriptor Applied to Wide-Baseline Stereo", "IEEE Transactions on Pattern Analysis and Machine Intelligence", May 2010, pp. 815-830, vol. 32, No. 5, Publisher: IEEE.
Ingvalson, "Data Sharing Among Conditionally Independent Parallel Filters", "U.S. Appl. No. 13/679,170", Nov. 16, 2012, pp. 1-25.
Wang et al., "Simultaneous Localization, Mapping and Moving Object Tracking", Jun. 2007, pp. 1-47, vol. 26, Publisher: International Journal of Robotics Research.
Frew, "Flight Demonstrations of Self-directed Collaborative Navigation of Small Unmanned Aircraft", Sept. 2004, pp. 1-14, Publisher: American Institute of Aeronautics and Astronautics.
Knuth, Joseph and Prabir Barooah, "Distributed Collaborative Localization of Multiple Vehicles from Relative Pose Measurements", "47th Annual Allerton Conference on Communication, Control, and Computing", 2009, pp. 314-321, Publisher: Allerton, Published in: Monticello, IL.
Riley, Jennifer M. and Mica R. Endsley, "Situation Awareness in HRI with Collaborating Remotely Piloted Vehicles", "Proceedings of the Human Factors and Ergonomics Society 49th Annual Meeting", 2005, pp. 407-411, Publisher: Human Factors and Ergonomics Society.
"Vision Based Navigation and Precision/Dynamic Targeting for Air Vehicles (ImageNav)", "Available at www.virtualacquisitionshowcase.com/document/1301/briefing accessed Mar. 3, 2011", Nov. 2, 2009, pp. 1-5, Publisher: Scientific Systems Company, Inc.
European Patent Office, "Communication under Rule 71(3) EPC", "from Foreign Counterpart of U.S. Appl. No. 13/053,777", Mar. 5, 2013, pp. 1-27, Published in: EP.
U.S. Patent and Trademark Office, "Notice of Allowance", "U.S. Appl. No. 13/672,337", Mar. 14, 2013, pp. 1-20.
U.S. Patent and Trademark Office, "Supplemental Notice of Allowance", "U.S. Appl. No. 13/672,337", Apr. 10, 2013, pp. 1-9.
Foxlin, "Towards a Generalized Sensor Fusion Architecture for Distributed Real-time Tracking, Auto-calibration and Environment Mapping", "International Symposium on Augmented Reality", 2001.
U.S. Patent and Trademark Office, "Notice of Allowance", "from U.S. Appl. No. 13/053,777", Nov. 29, 2013, pp. 1-41, Published in: US.

* cited by examiner

COLLABORATIVE NAVIGATION USING CONDITIONAL UPDATES

BACKGROUND

Collaborative navigation systems allow two or more navigation systems to work together to produce improved navigation solutions. For example, many autonomous unmanned aerial vehicles can operate and navigate in an environment in the application of surveillance, remote sensing, or rescue. In a collaborative navigation system, these vehicles can cooperate to improve navigation by sharing information.

Communication between two platforms is available sometime during the collaborative navigation procedure. The connections can be established by any measurement which allows the two vehicles to make estimates of the same state. Examples include ranging radio between the two moving platforms, which allow each unit to estimate the positions of both, or using the shared Simultaneous Localization and Mapping (SLAM) landmark states between the two platforms.

A single vehicle integrated navigation system includes an inertial measurement unit and aiding sensors. For example, the inertial measurement unit uses strap-down sensors mechanized as a strap-down unit. The aiding sensors may include a global position system (GPS) receiver, image based sensors, Doppler velocity sensors, or other sensors. A single vehicle integrated navigation system combines the data from the navigation states (such as position, velocity, and altitude) generated by the dynamic plant with the independent aiding sensor data in a Kalman filter algorithm. For example, the navigation algorithm can be based on the Extended Kalman Filter (EKF) which provides, under certain assumptions, a consistent way to deal with the uncertainties associated with the movement and measurement processes.

In collaborative navigation, the vehicle uses information from its own platform sensor, as well as that from other platforms, to enhance a navigation solution of all the platforms. The SLAM method is one way for the navigation, that is, the information obtained by a sensor on a mobile platform is processed to obtain an estimate of its own position while building a map of the environment.

Previous methods for collaborative navigation have used a global centralized filter that includes all the vehicles' navigation states, the dynamic model for each vehicle, and the landmarks (when using SLAM techniques). The disadvantage of a global centralized filter is that each system must maintain estimates of all the states of all the systems. With large numbers of systems collaborating, this becomes computationally impractical. Centralized approaches are also more vulnerable to communication disruptions.

SUMMARY

A method for collaborative navigation between two or more platforms is provided. The method comprises establishing a communication link between a first platform and a second platform, making a sensor measurement from the first platform, updating state and covariance elements of the first platform, and transmitting the updated state and covariance elements from the first platform to the second platform. A conditional update is performed on the second platform to compute a new estimate of state and covariance elements on the second platform, which takes into account the measurement from the first platform. The method further comprises making a sensor measurement from the second platform, updating state and covariance elements of the second platform, and transmitting the updated state and covariance elements from the second platform to the first platform. A conditional update is performed on the first platform to compute a new estimate of state and covariance elements on the first platform, which takes into account the measurement from the second platform.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the drawings, in which.

DETAILED DESCRIPTION

In the following detailed description, reference is made to the accompanying drawings that form a part hereof, and in which is shown by way of illustration specific illustrative embodiments. It is to be understood, however, that other embodiments may be utilized and that logical, mechanical, and electrical changes may be made.

A method and system is provided for collaborative navigation using conditional updates. In the present approach, information is exchanged between two or more navigation platforms, in order to improve the quality of navigation estimates of all the platforms. The present method allows each platform to share its unique sensor information with the other platforms in a statistically sound way, resulting in improvement of the navigation quantity estimates of all the platforms.

There is no central filter for the collaborative navigation. The navigation filters are distributed in among the available moving platforms. If there is no shared information, each platform works independently using only its own sensed data. If there is shared information, the interdependence between the platforms is established. The individual platform navigation system can then be integrated into the collaborative navigation network.

A conditional update method is applied in the present technique to share information between two or more (multiple) vehicles to enable cooperative navigation between the vehicles. For example, in a scenario where there are two vehicles and two landmarks, the communication between the two vehicles is open, and both vehicles see both of the landmarks. The present approach provides for collaborative navigation between the two vehicles.

The Bayesian conditional update uses the property of conditional independence. Two random variables x and y are conditionally independent given z when $p(x,y|z)=p(x|z)*p(y|z)$, where p is the probability. This expression is equivalent to $p(x|y,z)=p(x|z)$. The Bayesian conditional update uses this formulation to update and compute a new distribution for x given z; y is not needed. The provided examples deal with linear, Gaussian problems with an Extended Kalman Filter mechanization. However the present approach is general and the Bayesian conditional update can also be applied to collaborative navigation with non-linear dynamics and/or non- Gaussian statistics, as well as other types of estimators, such as Particle or Unscented Kalman Filters.

Figure 1:
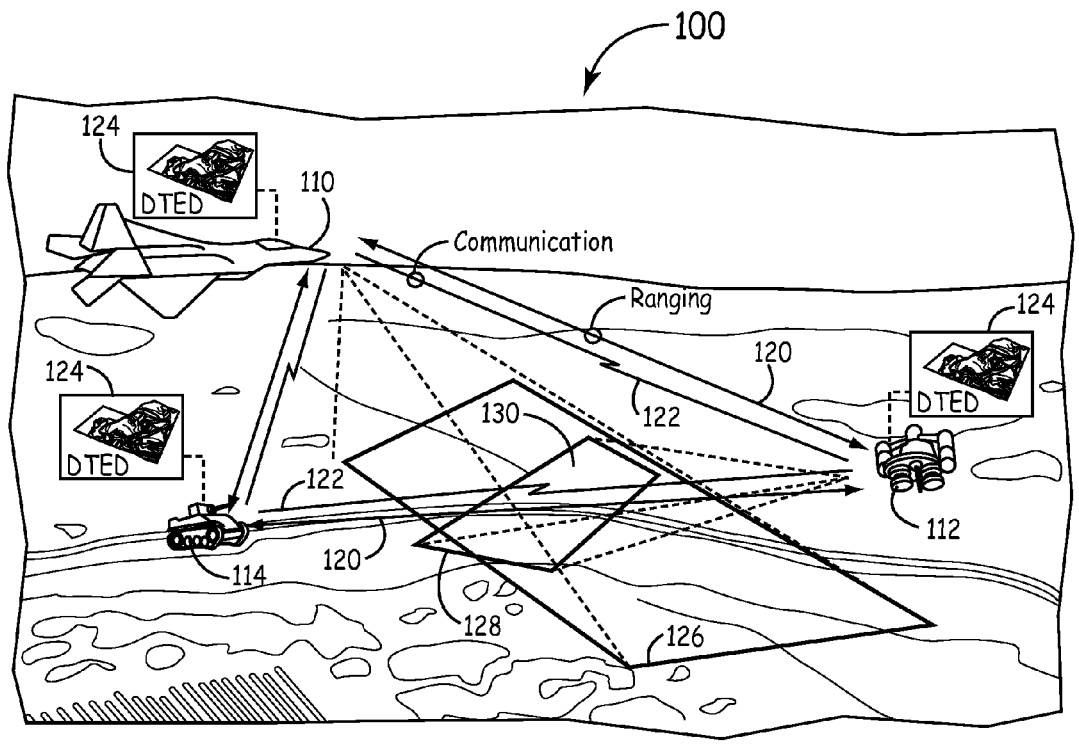
FIG. 1 illustrates an exemplary application environment for collaborative navigation using conditional updates between collaborating platforms.

FIG. 1 illustrates an exemplary application environment 100 for collaborative navigation using conditional updates between collaborating platforms. As shown in FIG. 1, three vehicles are collaborating to improve their navigation solutions, including a high altitude aircraft 110, a low altitude aircraft 112 such as an unmanned aerial vehicle (UAV), and a land vehicle 114. Radio ranging measurements 120 are made between each of the vehicles and cameras on the vehicles can observe common landmark features on the terrain. Communication links 122 also connect the vehicles. Each of the vehicles also has access to Digital Terrain Elevation Data (DTED) 124. The camera on aircraft 110 provides a field of view 126, and the camera on aircraft 112 provides a field of view 128. At some point in time, the fields of view 126 and 128 intersect to produce an overlapping field of view 130.

The present approach applies the Bayesian conditional update method of information exchange to improve the solutions of a set of collaborating navigation systems. The conditional update method provides a way to maintain multiple submaps consistently in a Simultaneous Localization and Mapping (SLAM) system. This is described in a paper by Pinies et al., *Scalable SLAM Building Conditionally Independent Local Maps*, Proceedings of the 2007 IEEE/RSJ International Conference on Intelligent Robots and Systems, pp. 3466-3471, San Diego, Calif. (2007), the disclosure of which is herein incorporated by reference. The Pinies et al. paper describes the use of local mapping algorithms in the context of Extended Kalman Filter (EKF) SLAM, but without the constraint of probabilistic independence between local maps. Salient features of the environment or vehicle state components such as velocity or global attitude can be shared between local maps without affecting the posterior joining process or introducing any undesirable approximations in the final global map estimate. The overload cost introduced by the technique is minimal since building up local maps does not require any additional operations apart from the usual EKF steps. As the algorithm works with covariance matrices, well-known data association techniques can be used in the usual manner. The initialization of the features is based on the inverse depth algorithm. The Pinies et al. paper describes the use of Bayesian conditional updates for SLAM map management in single platform navigation. The present approach applies this technique to collaboration between the multiple platforms.

When communication between platforms is available, there is a sharing of data between the platforms. During a communication loss, the individual platforms will propagate the navigation information and maintain the state correlation status, and when communication is re-established, the collaborative navigation may be resumed.

An individual collaborative filter is structured as a covariance form extended Kalman filter. States represented typically include the position, velocity, and attitude of each platform sharing information. Additional states, such as GPS pseudo-range biases, landmark positions, or ranges may be shared as the communication system allows. In general, increasing the number of shared states drives the distributed solution nearer to a globally optimal solution. The present system is capable of taking advantage of high bandwidth communication systems by increasing the amount of shared information, but flexibility in the set of shared states selection ensures that the algorithm will be feasible with relatively low-bandwidth communication.

Using of the conditional covariance update allows information to be exchanged directly between separate but partially correlated Kalman filters. Conditional updates exploit conditional independence between states to use observations of one state to implicitly observe another with minimal data transfer. Conditional updates, routed through an ad-hoc network of collaborative Kalman filters, can be used to exchange diverse information between multiple disparate platforms.

One example of the shared information can be the range measurement between the two platforms. Another example of the shared information can be the shared landmark when the two platforms observe the same object in the ground.

Figure 2:
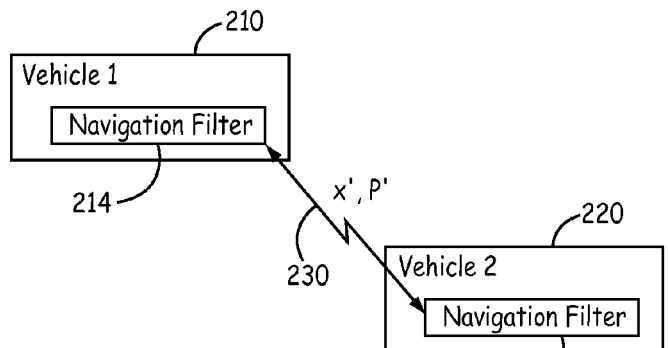
FIG. 2 is a data flow diagram showing the data transfer necessary for making conditional updates between collaborating platforms.

FIG. 2 is a data flow diagram showing the data transfer necessary for making conditional updates between collaborating platforms. A first vehicle 210 is in operative communication with a second vehicle 220. Each of the vehicles 210 and 220 include a navigation filter 214 and 224, respectively, such as a Kalman filter. A communication link 230 between the navigation filters 214 and 224 provides for sharing of data obtained by each vehicle with the other vehicle. The shared data includes shared elements of the state vector (x') and covariance matrix (P') of each vehicle.

To further illustrate the present approach, three navigation filters are defined with the following state vectors and covariance matrices:

$$x_1 = \begin{bmatrix} a \\ b \\ c \end{bmatrix} \quad P_1 = \begin{bmatrix} P_a & P_{ab} & P_{ac} \\ P_{ba} & P_b & P_{bc} \\ P_{ca} & P_{cb} & P_c \end{bmatrix} \quad \text{Filter 1}$$

$$x_2 = \begin{bmatrix} a \\ b \end{bmatrix} \quad P_2 = \begin{bmatrix} P_a & P_{ab} \\ P_{ba} & P_b \end{bmatrix} \quad \text{Filter 2}$$

$$x_3 = \begin{bmatrix} a \\ c \end{bmatrix} \quad P_3 = \begin{bmatrix} P_a & P_{ac} \\ P_{ca} & P_c \end{bmatrix} \quad \text{Filter 3}$$

where a, b, and c are state sub-vectors, and b and c are conditionally independent given a.

In this example, filter 1 represents a combined navigation filter containing all the states for two navigation systems, while filters 2 and 3 each represent a single system navigation filter, that have some states ("a") in common. Then, if states "b" and "c" are conditionally independent given states "a", filter 1 may be replaced with filters 2 and 3 and still maintain consistent and optimal estimates of a, b, and c. Whenever either filter gains information (in the form of a measurement update), the information is passed on to the other filter by forcing the distribution of a to be the same in both filters and then computing the conditional distribution of the other states (b or c), given the new distribution of a.

To demonstrate how the update works, imagine that filter 3 gets a new measurement, y. Using the conventional Kalman update, filter 3 produces updated estimates of its state vector and covariance:

$$x_3' = \begin{bmatrix} a' \\ c' \end{bmatrix} \quad P_3' = \begin{bmatrix} P_a' & P_{ac}' \\ P_{ca}' & P_c' \end{bmatrix}$$

Then, filter 2 may also benefit from the measurement y by receiving a conditional update from filter 3 in the following process steps:
1. Transmit shared elements of updated state and covariance (a', $P_a'$) from filter 3 to filter 2.
2. Replace filter 2 estimate of $P_a$ with updated $P_a'$ estimate from filter 3.

3. replace filter 2 estimate of a with updated a' estimate from filter 3.
4. perform conditional state update on filter 2 to produce updated b' estimate, where:

$$b' = b + (P_{ba}(P'_a)^{-1})(a' - a)$$

5. perform conditional covariance update on filter 2 to produce updated $P'_b$ and $P'_{ba}$, where:

$$P'_b = P_b + (P_{ba}(P'_a)^{-1})P_{ab}$$

$$P'_{ba} = P_{ba}P_a^{-1}P'_a$$

Figure 3:
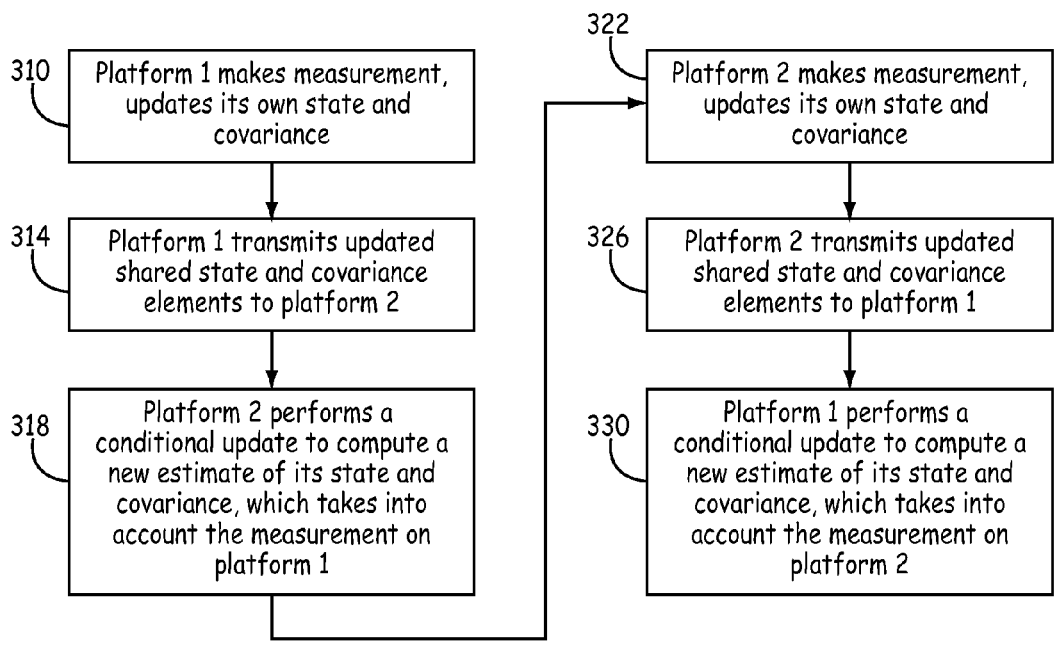
FIG. 3 is a process flow diagram showing a conditional update data flow between two collaborating platforms.

FIG. 3 is a process flow diagram showing a conditional update data flow between two navigation platforms. Initially, platform 1 makes a measurement, and updates its own state and covariance data (block 310). Platform 1 then transmits updated shared state and covariance elements to platform 2 (block 314). Next, platform 2 performs a conditional update to compute a new estimate of its state and covariance, which takes into account the measurement on platform 1 (block 318). Platform 2 then makes a measurement, and updates its own state and covariance (block 322). Thereafter, platform 2 transmits updated shared state and covariance elements to platform 1 (block 326). Platform 1 then performs a conditional update to compute a new estimate of its state and covariance, which takes into account the measurement on platform 2 (block 330).

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include or function with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable computer readable storage media may include, for example, non-volatile memory devices including semiconductor memory devices such as EPROM, EEPROM, or flash memory devices; magnetic disks such as internal hard disks or removable disks; magneto-optical disks; CDs, DVDs, Blu-ray discs, or other optical storage disks; nonvolatile ROM, RAM, and other like media; or any other media that can be used to carry or store desired program code in the form of computer executable instructions or data structures.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for collaborative navigation between two or more platforms, the method comprising:
   establishing a communication link between a first platform having a first navigation filter and a second platform having a second navigation filter, the first navigation filter including a first state vector $x_1$ and a first covariance matrix $P_1$, where:

$$x_1 = \begin{bmatrix} a \\ b \end{bmatrix} \quad P_1 = \begin{bmatrix} P_a & P_{ab} \\ P_{ba} & P_b \end{bmatrix},$$

the second navigation filter including a second state vector $x_2$ and a second covariance matrix $P_2$, where:

$$x_2 = \begin{bmatrix} a \\ c \end{bmatrix} \quad P_2 = \begin{bmatrix} P_a & P_{ac} \\ P_{ca} & P_c \end{bmatrix},$$

wherein a, b, and c are state vector elements, with b and c being conditionally independent given a, wherein the first and second state vectors have at least one common state vector element (a), and the first and second covariance matrices have at least one common covariance matrix element ($P_a$);
   receiving at the first navigation filter an updated estimate of the common state vector element (a') and an updated estimate of the common covariance matrix element ($P'_a$) from the second navigation filter;
   replacing the state vector element a in the first navigation filter with the updated estimate of the common state vector element a' from the second navigation filter;
   replacing the covariance matrix element $P_a$ in the first navigation filter with the updated estimate of the covariance matrix element $P'_a$ from the second navigation filter;
   performing a conditional state update of the first navigation filter to produce an updated estimate of a state vector element b', where:

$$b' = b + (P_{ba}(P'_a)^{-1})(a' - a);$$

performing a conditional covariance update of the first navigation filter to produce an updated estimate of covariance matrix elements $P'_b$ and $P'_{ba}$, where:

$$P'_b = P_b + (P_{ba}(P'_a)^{-1})P_{ab}, \text{ and}$$

$$P'_{ba} = P_{ba}P_a^{-1}P'_a.$$

2. The method of claim 1, further comprising:
   establishing a communication link between the first platform and a third platform; and
   establishing a communication link between the second platform and the third platform.

3. The method of claim 2, wherein the first platform is an aircraft at a first altitude.

4. The method of claim 3, wherein the second platform is an aircraft at a second altitude different from the first altitude.

5. The method of claim 4, wherein the third platform is a ground vehicle.

6. The method of claim 5, wherein each of the platforms has access to digital terrain elevation data (DTED).

7. The method of claim 2, further comprising taking radio ranging measurements between each of the platforms.

8. A computer program product, comprising:
a non-transitory computer readable medium having instructions stored thereon executable by a processor to perform a method for collaborative navigation between two or more vehicles, the method comprising:
establishing a communication link between a first vehicle having a first navigation filter and a second vehicle having a second navigation filter, the first navigation filter including a first state vector $x_1$ and a first covariance matrix $P_1$, where:

$$x_1 = \begin{bmatrix} a \\ b \end{bmatrix} P_1 = \begin{bmatrix} P_a & P_{ab} \\ P_{ba} & P_b \end{bmatrix},$$

the second navigation filter including a second state vector $x_2$ and a second covariance matrix $P_2$, where:

$$x_2 = \begin{bmatrix} a \\ c \end{bmatrix} P_2 = \begin{bmatrix} P_a & P_{ac} \\ P_{ca} & P_c \end{bmatrix},$$

wherein a, b, and c are state vector elements, with b and c being conditionally independent given a, wherein the first and second state vectors have at least one common state vector element (a), and the first and second covariance matrices have at least one common covariance matrix element ($P_a$);
receiving at the first navigation filter an updated estimate of the common state vector element (a') and an updated estimate of the common covariance matrix element ($P'_a$) from the second navigation filter;
replacing the state vector element a in the first navigation filter with the updated estimate of the common state vector element a' from the second navigation filter;
replacing the covariance matrix element $P_a$ in the first navigation filter with the updated estimate of the covariance matrix element $P'_a$ from the second navigation filter;
performing a conditional state update of the first navigation filter to produce an updated estimate of a state vector element b', where:

$b' = b + (P_{ba}(P'_a)^{-1})(a' - a);$ performing a conditional covariance update of the first navigation filter to produce an updated estimate of covariance matrix elements $P'_b$ and $P'_{ba}$, where:

$P'_b = P_b + (P_{ba}(P'_a)^{-1})P_{ab}$, and $P'_{ba} = P_{ba} P_a^{-1} P'_a.$

9. The computer program product of claim 8, wherein the method further comprises:
establishing a communication link between the second vehicle and a third vehicle.

10. The computer program product of claim 9, wherein each of the vehicles has access to digital terrain elevation data (DTED).

11. The computer program product of claim 9, wherein the method further comprises taking radio ranging measurements between each of the vehicles.

12. A system for collaborative navigation between two or more platforms, the system comprising:
a first platform; and
a second platform in operative communication with the first platform;
wherein the first platform and the second platform each comprise:
at least one processor;
at least one sensor mounted on each platform and operatively coupled to the processor in each platform;
a navigation filter operatively coupled to the processor in each platform; and
a memory unit operatively coupled to the processor in each platform and containing digital terrain elevation data (DTED);
wherein the memory unit in the first platform includes machine readable instructions executable by the processor in the first platform to:
establish a communication link between the first platform and the second platform, the navigation filter of the first platform including a first state vector $x_1$ and a first covariance matrix $P_1$ where:

$$x_1 = \begin{bmatrix} a \\ b \end{bmatrix} P_1 = \begin{bmatrix} P_a & P_{ab} \\ P_{ba} & P_b \end{bmatrix},$$

the navigation filter of the second platform including a second state vector $x_2$ and a second covariance matrix $P_2$, where:

$$x_2 = \begin{bmatrix} a \\ c \end{bmatrix} P_2 = \begin{bmatrix} P_a & P_{ac} \\ P_{ca} & P_c \end{bmatrix},$$

wherein a, b, and c are state vector elements, with b and c being conditionally independent given a, wherein the first and second state vectors have at least one common state vector element (a), and the first and second covariance matrices have at least one common covariance matrix element ($P_a$);
receive at the navigation filter of the first platform an updated estimate of the common state vector element (a') and an updated estimate of the common covariance matrix element ($P'_a$) from the navigation filter of the second platform;
replace the state vector element a in the navigation filter of the first platform with the updated estimate of the common state vector element a' from the navigation filter in the second platform;
replace the covariance matrix element $P_a$ in the navigation filter of the first platform with the updated estimate of the covariance matrix element $P'_a$ from the navigation filter in the second platform;
perform a conditional state update of the navigation filter of the first platform to produce an updated estimate of a state vector element b', where:

$b' = b + (P_{ba}(P'_a)^{-1})(a' - a);$ perform a conditional covariance update of the navigation filter of the first platform to produce an updated estimate of covariance matrix elements $P'_b$ and $P'_{ba}$ where:

$P'_b = P_b + (P_{ba}(P'_a)^{-1})P_{ab}$, and $P'_{ba} = P_{ba} P_a^{-1} P'_a.$

13. The system of claim 12, further comprising a third platform in operative communication with the first platform and the second platform.

14. The system of claim 13, wherein the first platform is a manned aircraft.

15. The system of claim 14, wherein the second platform is an unmanned aerial vehicle.

16. The system of claim 15, wherein the third platform is a ground vehicle.

17. The system of claim 13, wherein the memory unit in the first platform includes further machine readable instructions executable by the processor in the first platform to establish a communication link between the first platform and the third platform, and the memory unit in the second platform includes machine readable instructions executable by the processor in the second platform to establish a communication link between the second platform and the third platform.

18. The system of claim 17, wherein the memory unit in the first platform includes further machine readable instructions executable by the processor in the first platform to take radio ranging measurements.

\* \* \* \* \*